United States Patent
Oh (10) Patent No.: US 8,301,729 B2
(45) Date of Patent: Oct. 30, 2012

(54) SYSTEM AND METHOD FOR PRESENCE SUBSCRIPTION DELEGATION

(75) Inventor: Jae-Kwon Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 12/361,527

(22) Filed: Jan. 28, 2009

(65) Prior Publication Data

US 2009/0193117 A1 Jul. 30, 2009

(30) Foreign Application Priority Data

Jan. 28, 2008 (KR) .................. 10-2008-0008724
Jan. 30, 2008 (KR) .................. 10-2008-0009396

(51) Int. Cl.
*G06F 15/16* (2006.01)
*G06F 17/00* (2006.01)
*H04M 3/42* (2006.01)

(52) U.S. Cl. .......... 709/219; 709/232; 726/1; 455/414.1

(58) Field of Classification Search .................. None
See application file for complete search history.

(56) References Cited

U.S. PATENT DOCUMENTS

| 7,734,732 | B2 * | 6/2010 | Soelberg et al. | ............... 709/219 |
| 2008/0092233 | A1 * | 4/2008 | Tian et al. | ..................... 726/21 |
| 2008/0108332 | A1 * | 5/2008 | Tian et al. | .................. 455/414.1 |

FOREIGN PATENT DOCUMENTS

| CN | 1863172 A | 11/2006 |
| CN | 1863200 A | 11/2006 |
| KR | 10-2006-0070339 A | 6/2006 |
| WO | 2007-073545 A2 | 6/2007 |

* cited by examiner

*Primary Examiner* — Wen-Tai Lin
(74) *Attorney, Agent, or Firm* — Jefferson IP Law, LLP (57) ABSTRACT

A system and method for presence subscription delegation in a multi-domain environment in an SIP-based presence system are provided, in which a watcher transmits a presence subscription delegation request to a presence subscription delegation handler of a delegating user, the presence subscription delegation handler performs delegation authorization for the received presence subscription delegation request according to a presence delegation authorization rule of the delegating user being authorization information about presence subscription delegation, and a presence server of a presentity receives the presence subscription delegation request from the presence subscription delegation handler, performs presence authorization according to a presence authorization rule of the presentity, and transmits presence information about the presentity to the watcher via the presence subscription delegation handler.

16 Claims, 6 Drawing Sheets

SYSTEM AND METHOD FOR PRESENCE SUBSCRIPTION DELEGATION

BACKGROUND OF THE INVENTION

1. Field of the Invention

The present invention generally relates to a system and method for providing a presence subscription delegation service in a Session Initiation Protocol (SIP)-based presence system. More particularly, the present invention relates to a presence subscription delegation service that can be provided in a multi-domain environment as well as in a single-domain environment.

2. Description of the Related Art

Presence service is a service of collecting information about the current status of a user's communications from a set of devices and providing the information to another user. The user that is watched is called presentity, the communication status information is called presence information, and the user that receives the presence information is called a watcher.

An SIP-based presence service is implemented using RFC 3856 "Presence Event Package for the SIP" based on RFC 3265 "SIP-Specific Event Notification".

Figure 1A:
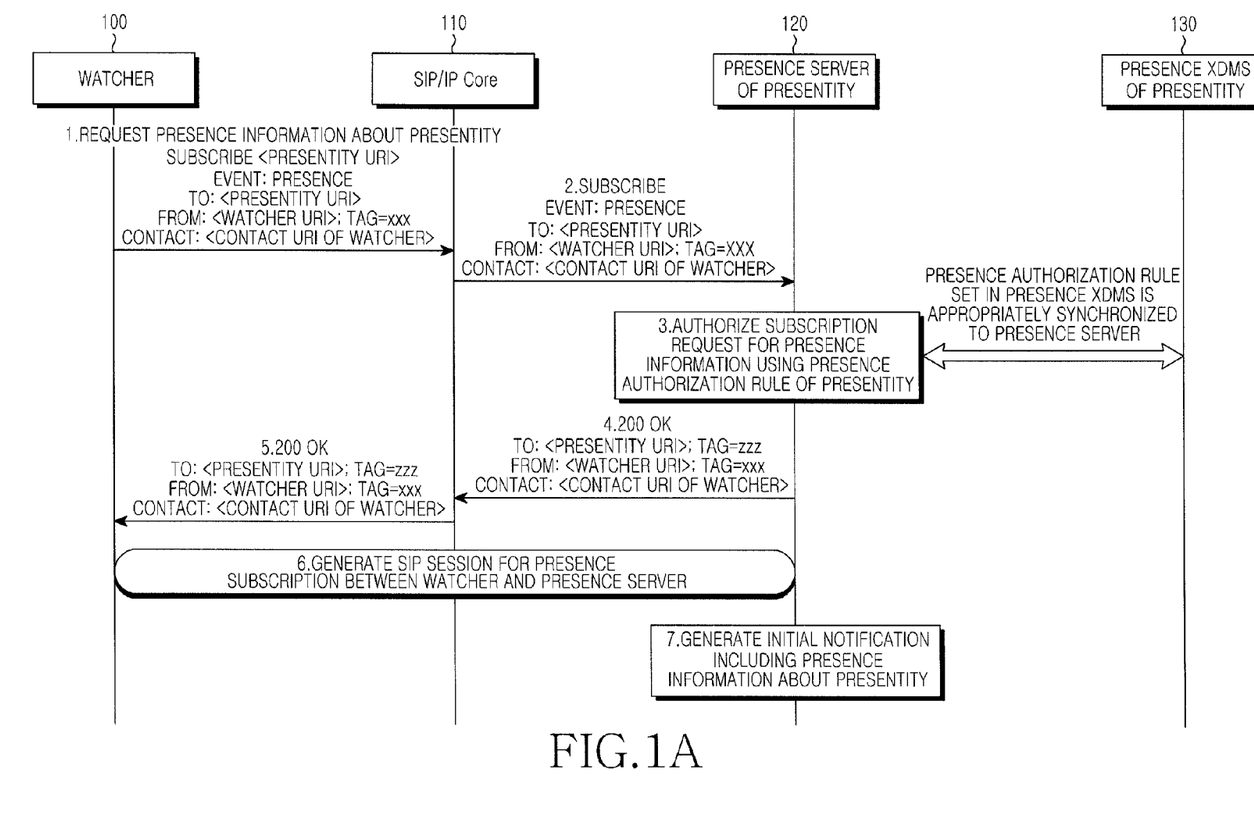
FIGS. 1A and 1B are a diagram illustrating a signal flow for a conventional SIP-based presence service.
Figure 1B:
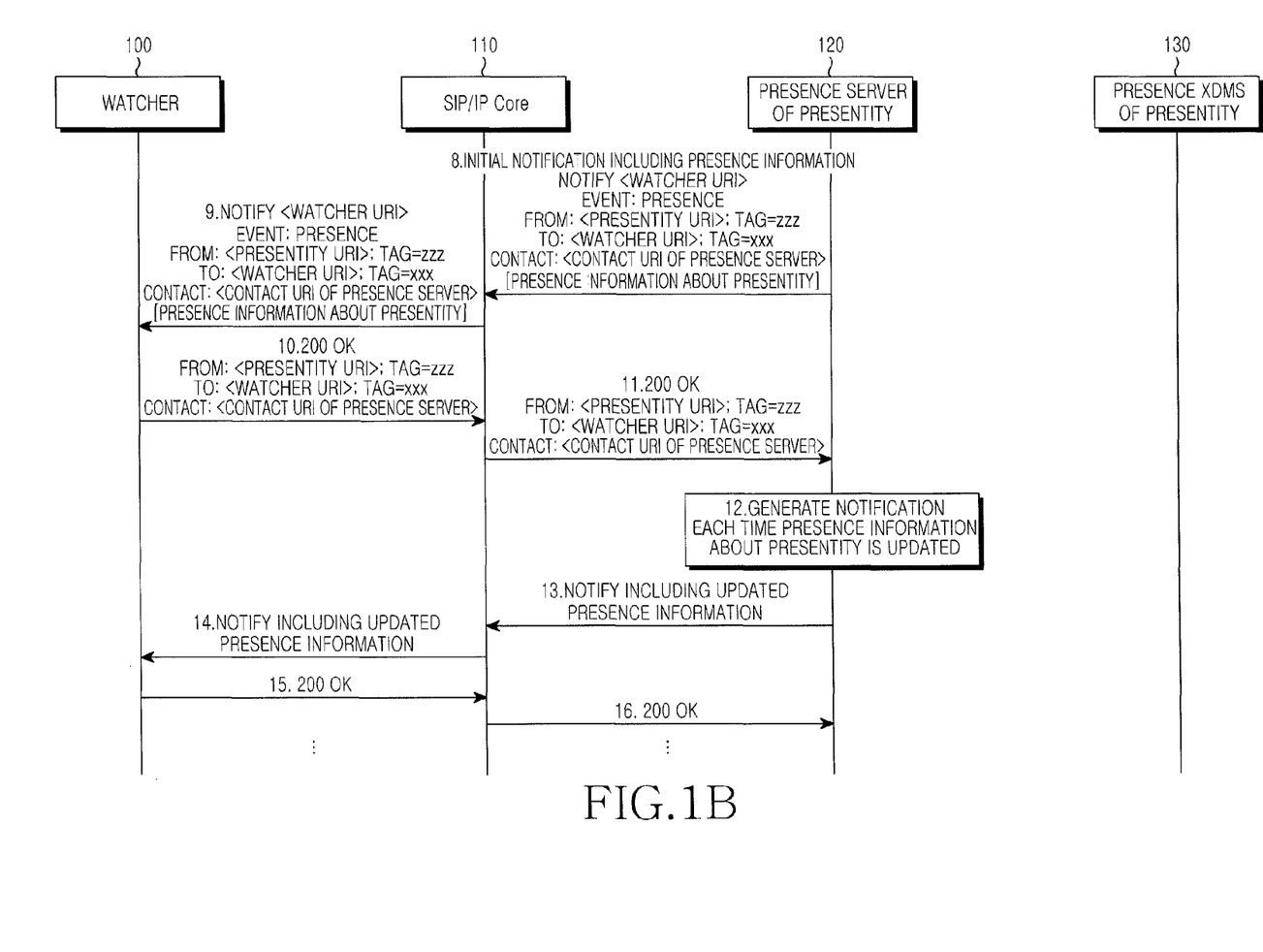

FIGS. 1A and 1B are a diagram illustrating a signal flow for a conventional SIP-based presence service.

Referring to FIGS. 1A and 1B, a watcher 100 transmits a request for SIP SUBSCRIBE to Presence Event to a presentity's presence server 120 via a Session Initiation Protocol/Internet Protocol (SIP/IP) core 110 in order to receive presence information about a presentity in steps 1 and 2. The presence subscription request for the presentity is realized by an SIP SUBSCRIBE message for presence event with "Request Line" set to <presentity URI>, "To header" set to <presentity URI>, "From header" set to <watcher URI>, and "Contact header" set to "watcher's contact URI".

Upon receipt of the presence subscription request from the watcher 100, the presence server 120 performs presence authorization according to a presence authorization rule of the presentity in step 3. The presence authorization includes presence subscription authorization for determining whether the presentity permits presence subscription to the watcher and presence content authorization for determining presence information to be delivered to the watcher, if the presentity gives permission to the watcher.

After successful presence authorization, the presence server 120 transmits an SIP 200 OK message to the watcher 100 via the SIP/IP core 110 in steps 4 and 5 and establishes an SIP session for presence event between the presence server 120 and the watcher 100 in step 6.

When the SIP session setup is successful, the presence server 120 transmits presence information about the presentity to the watcher 100 via the SIP/IP core 110 by an SIP NOTIFY message for presence event in steps 7, 8 and 9. The SIP NOTIFY message has "Request Line" set to <watcher's contact URI>, "To header" set to <watcher URI>, "From header" set to <presentity URI>, and "Contact header" set to <presence server's contact URI>. That is, the SIP NOTIFY message is delivered by the SIP session for presence event established between the presence server 120 and the watcher 100.

The SIP NOTIFY message includes, in its body, presence information about the presentity that the presence server 120 intends to transmit to the watcher 100.

Upon receipt of the SIP NOTIFY message, the watcher 100 transmits an SIP 200 OK message to the presence server 120 via the SIP/IP core 110 to indicate the successful reception in steps 10 and 11.

Each time the presence information about the presentity is updated, the presence server 120 transmits the updated presence information to the watcher 100 by an SIP NOTIFY message configured in the same manner as the initial SIP NOTIFY message in steps 13 and 14 and the watcher 100 receives the SIP NOTIFY message in steps 15 and 16.

A new requirement for the conventional presence service has emerged. That is, the watcher 100 should be capable of presence subscription on behalf of another user. This is called presence subscription delegation. The user delegates the right to request presence subscription for him to the watcher 100 and thus the watcher 100 receives presence information about a presentity authorized to the user rather than presence information about a presentity authorized to the watcher 100. However, the conventional presence service cannot provide the presence subscription delegation service.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a system and method for enabling a watcher to perform presence subscription on behalf of a particular in a multi-domain environment as well as in a single-domain environment.

In accordance with an aspect of exemplary embodiments of the present invention, there is provided a system for presence subscription delegation, in which a watcher transmits a presence subscription delegation request to a presence subscription delegation handler of a delegating user, the presence subscription delegation handler receives the presence subscription delegation request from the watcher and performs delegation authorization for the presence subscription delegation request according to a presence delegation authorization rule of the delegating user being authorization information about presence subscription delegation, and a presence server of a presentity receives the presence subscription delegation request from the presence subscription delegation handler, performs presence authorization according to a presence authorization rule of the presentity, and transmits presence information about the presentity to the watcher via the presence subscription delegation handler.

In accordance with another aspect of exemplary embodiments of the present invention, there is provided a method for presence subscription delegation, in which a presence subscription delegation request is transmitted to a presence subscription delegation handler of a delegating user by a watcher, delegation authorization is performed for the presence subscription delegation request according to a presence delegation authorization rule of the delegating user being authorization information about presence subscription delegation by the presence subscription delegation handler, the presence subscription delegation request is transmitted to a presence server of a presentity by the presence subscription delegation handler, if the delegation authorization is successful, and presence authorization is performed according to a presence authorization rule of the presentity and presence information about the presentity is transmitted to the watcher via the presence subscription delegation handler by the presence server.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In exemplary embodiments of the present invention, "presence subscription delegation" is defined as a function for delegating the right to request presence subscription of a particular subscriber to a watcher so that the watcher can request presence subscription on behalf of the user and receive presence information about a presentity authorized to the user rather than presence information about a presentity authorized to the watcher.

To distinguish the conventional watcher from the watcher that requests presence subscription delegation in the present invention, the latter is referred to as a "presence subscription delegated user (delegated user, in short)" and the user that delegates its presence subscription right to the watcher is referred to as a "delegating user".

A system and method for presence subscription delegation according to the present invention is designed to satisfy the following system requirements. When the watcher generates a presence subscription delegation request as a delegated user, (1) the delegated user can request presence subscription about a presentity on behalf of a delegating user. (2) The delegating user should be able to control only authorized watchers to set presence subscription delegation. (3) The delegating user should be able to control already set presence subscription delegation continuously. (4) A presentity should be able to determine whether a watcher's presence subscription request is for presence subscription delegation or for conventional presence subscription and control a presence subscription delegation request separately. (5) Presence subscription delegation can be performed when the delegated user, the delegating user, and the presentity are in different domains as well as when they are in the same domain.

Figure 2:
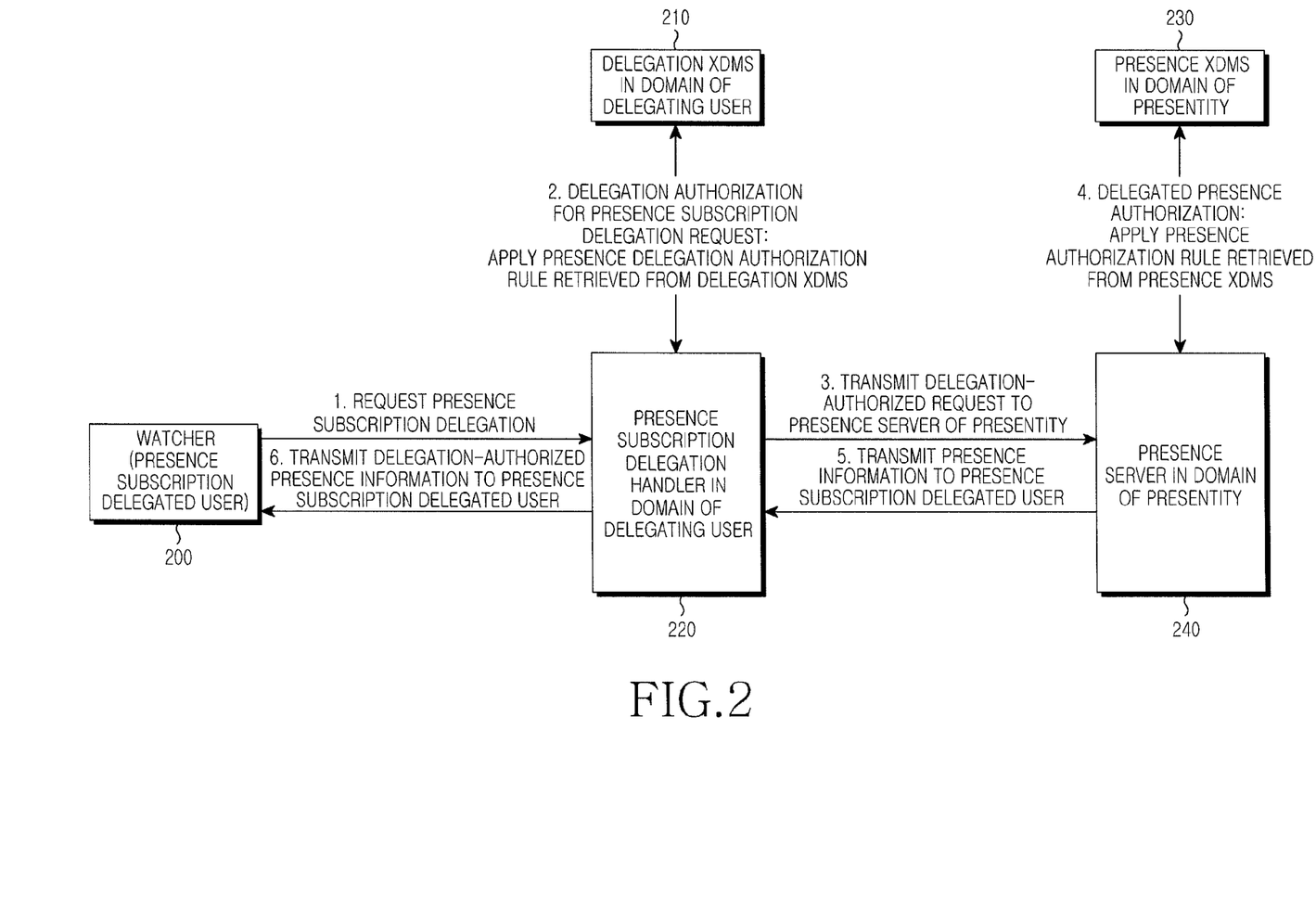
FIG. 2 is a block diagram of a presence subscription delegation system according to the present invention.

FIG. 2 is a block diagram of a presence subscription delegation system according to the present invention.

The present invention proposes an entity called "presence subscription delegation handler" 220 through which a delegating user can control presence subscription delegation of a watcher 200. A presence subscription delegation request from the watcher 200 is transmitted for authorization always to the presence subscription delegation handler 220 of the delegating user, so that the delegating user can control the presence subscription delegation of the watcher 200 in step 1.

In the present invention, this authorization process is referred to as "delegation authorization". It is checked whether the delegating user has delegated the authority to the watcher 200 in step 2.

In the present invention, the delegation authorization should be performed based on a presence delegation authorization rule set by the delegating user. The presence delegation authorization rule specifies delegation authorization information, for example, information about watchers that are permitted to request presence subscription delegation and information about the types of presence information accessible to the watchers. The delegation authorization information is stored.

The presence delegation authorization rule can be preset by the delegating user and stored in a proposed entity called "delegation XML Document Management Server (delegation XDMS)" 210 and the presence subscription delegation handler 220 can perform the delegation authorization based on the presence delegation authorization rule.

When the delegation authorization is successful for the presence subscription delegation request, the presence subscription delegation request is delivered to a presence server 240 of a presentity in step 3. The presence server 240 of the presentity performs "delegated presence authorization", recognizing that the received request is a presence subscription delegation request in step 4.

The delegated presence authorization is performed in the following two processes. That is, it is determined whether the presentity has permitted the presence subscription delegation of his presence information, so that the presentity can control the presence subscription delegation. If the check turns out to be positive, the presence authorization is performed for the delegating user rather than for the watcher 200 in the conventional manner. The conventional presence authorization includes presence subscription authorization for determining whether the presentity has permitted the presence subscription of the delegating user and presence content authorization for determining presence information to be delivered, if the permission was given.

When the delegated presence authorization is successful, the presence server 240 transmits presence information about the presentity, permitted to the delegating user rather than to the watcher 200 to the presence subscription delegation handler 220, as a presence subscription delegation response in step 5. The presence subscription delegation handler 220 applies the presence delegation authorization rule to the presence subscription delegation response when needed and notifies the watcher 200 of the rule application result in step 6.

The watcher 200 requesting the presence subscription delegation, the presence subscription delegation handler 220 of the delegating user, the presence server 240 of the presentity may reside in different domains. It is to be understood that even in this case, the system for presence subscription delegation according to the present invention can operate successfully.

Figure 3:
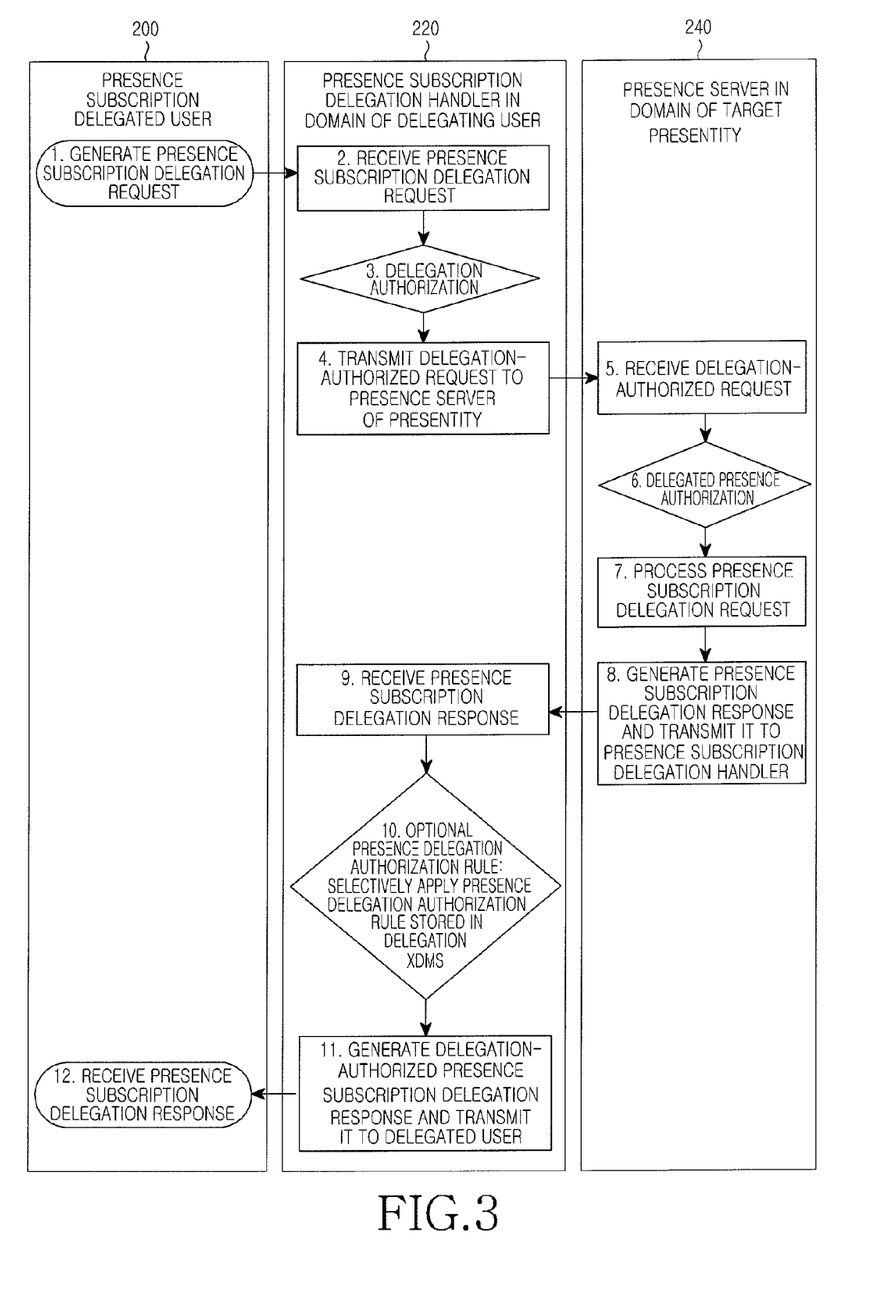
FIG. 3 is a flowchart illustrating an authorization procedure for presence subscription delegation according to an exemplary embodiment of the present invention.

FIG. 3 is a flowchart illustrating an authorization procedure for presence subscription delegation according to an exemplary embodiment of the present invention.

Referring to FIG. 3, the presence subscription delegation handler 220 of the delegating user performs "delegation authorization" for a presence subscription delegation request from the watcher 200 in step 3. If the delegation authorization is successful, the presence server 240 of the presentity performs delegated presence authorization in step 6. As stated before, the delegation authorization is the process of determining whether the delegating user has permitted the presence subscription delegation to the watcher 200 according to the presence delegation authorization rule of the delegating user stored in the delegation XDMS 210 of the delegating user. The delegated presence authorization is the process of determining based on a presence authorization rule of the presentity stored in a presence XDMS 230 of the presentity whether the presentity has permitted presence subscription delegation, whether the presentity has permitted presence subscription to the delegating user, if the presentity has permitted presence subscription delegation, and what presence information about the presentity was permitted.

When the authorizations are successful, the presence server 240 generates a response for the presence subscription delegation request and transmits the response to the presence subscription delegation handler 220. The presence subscription delegation handler 220 delivers the response to the delegated user 200. Herein, the presence subscription delegation handler 220 may apply an additional presence delegation authorization rule in step 10, which is optional. For instance, the presence subscription delegation handler 220 can filter only presence information that the delegating user has permitted to the watcher 200, for transmission.

The request and response for presence subscription delegation are based on the results of the series of delegation authorizations.

Figure 4:
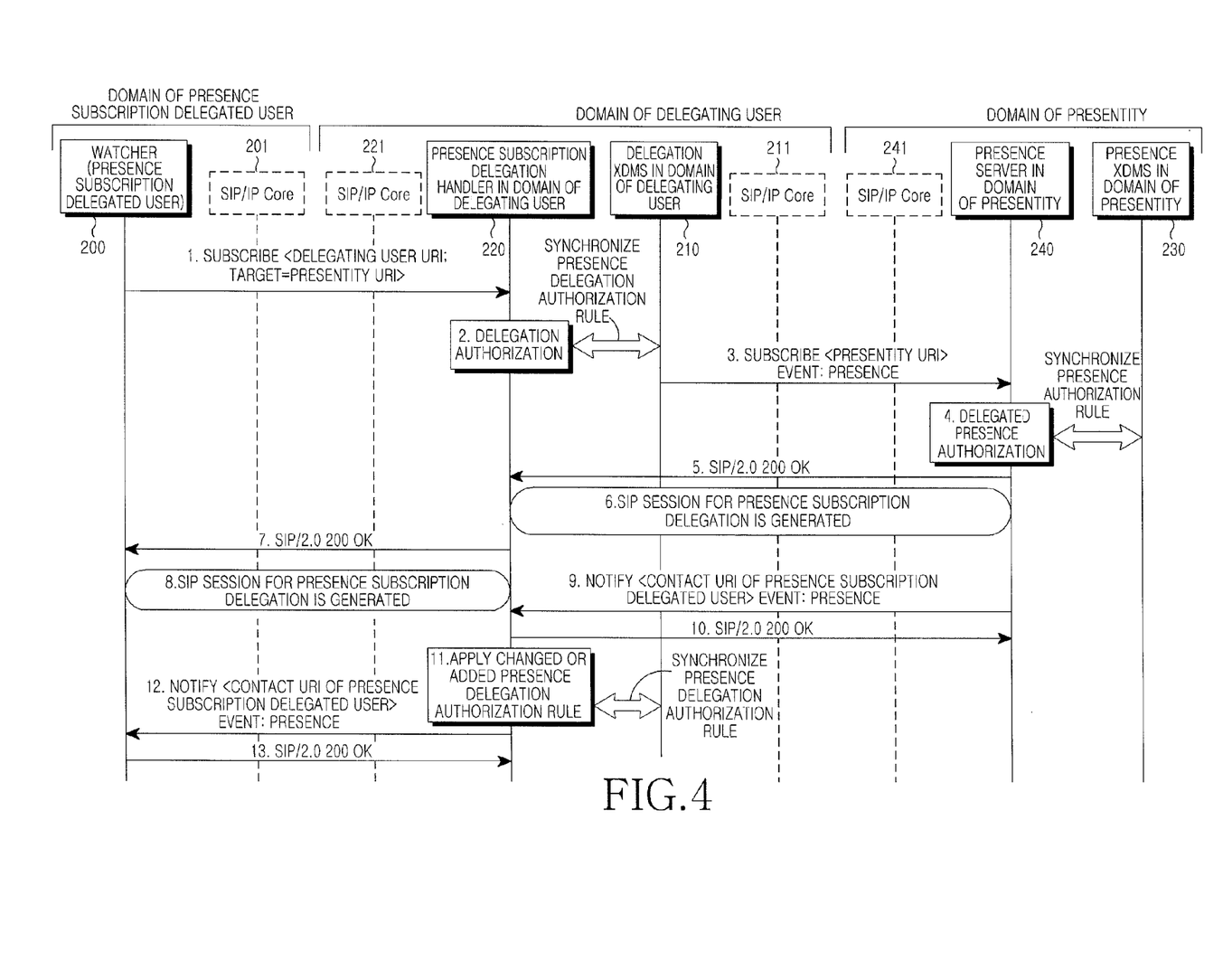
FIG. 4 is a diagram illustrating a signaling flow in the presence subscription delegation system according to an exemplary embodiment of the present invention.

The above presence subscription delegation system according to the present invention implements the following signaling flow. FIG. 4 is a diagram illustrating a signaling flow in the presence subscription delegation system according to an exemplary embodiment of the present invention.

Referring to FIG. 4, when the watcher 200 creates a presence subscription delegation request on behalf of some delegating user, the presence subscription delegation request includes an Identifier (ID) of the delegating user and an ID of a presentity and is transmitted to the presence subscription delegation handler 220 in the domain of the delegating user in step 1.

To configure the presence subscription delegation request in the above manner, a "target" SIP URI parameter defined in RFC 4458 "SIP URIs for Application such as Voicemail and Interactive Voice Response" is utilized in the present invention. That is, the presence subscription delegation request is configured as a SUBSCRIBE to presence event like a conventional presence subscription request. Yet, compared to the conventional presence subscription method, the presence subscription delegation request has "Request Line" set to <delegating user URI; target=presentity URI>, "To header" set to the same value, i.e. <delegating user URI; target=presentity URI>, and an added header "Accept-Contact" set to a media feature value indicating presence subscription delegation (e.g. +g.presence.delegation). The other headers and body of the presence subscription delegation request are set in the conventional manner. That is, "From header" is set to <URI of delegated user> and "Contact header" is set to <contact URI of delegated user>. The body may optionally include a filter about presence information as done in the conventional technology. Table 1 below illustrates the format of the presence subscription delegation request message generated by the watcher 200 according to an exemplary embodiment of the present invention.

TABLE 1

SUBSCRIBE <delegating user URI; target=presentity URI>
Via: ...
To: <delegating user URI; target= presentity URI>
From: <URI of delegated user>;tag=123
Call-ID: 100
Cseq: 1 SUBSCRIBE
Event: presence
Expires: 600
Accept-Contact: *;+g.presence.delegation;require;explicit
Accept: application/pidf+xml
Contact: <contact URI of delegated user>
Content-Type; ...
Content-Length: ...
[optional simple-filter of delegated user]

In accordance with the present invention, an SIP/IP core 201 of the delegated user 200 routes the presence subscription delegation request message to the domain of the delegating user based on the URI of the delegation user written in "Request Line". An SIP/IP core 221 of the delegating user routes the received presence subscription delegation request message to the presence subscription delegation handler 220 that takes charge of the URI of the delegating user based on the media feature tag "+g.presence.delegation". For clarity, an SIP/IP core routing part is marked simply with a dotted line in FIG. 4.

The presence subscription delegation handler 220 receives the presence subscription delegation request message, extracts the ID of the delegating user from the received message, and performs the afore-described delegation authorization for the delegated user in step 2.

If the delegation authorization is successful, the presence subscription delegation handler 220 extracts the ID of the presentity from the presence subscription delegation request message and requests presence subscription about the presentity as a B2BUA. For the presence server 240 of the presentity to process the presence subscription delegation according to the present invention, the presence subscription request about the presentity should indicate that it is a presence subscription delegation request and include the ID of the delegating user. Also, to indicate the successful delegation authorization, an ID of the delegating user authorized in his domain is included in step 3.

To configure the presence subscription delegation request message transmitted by the presence subscription delegation handler 220, the present invention utilizes a "History-info" SIP header defined in RFC 4244 "An Extension to the SIP for Request History Information". That is, the presence subscription delegation request message that the presence subscription delegation handler 220 as a B2BUA transmits to the presence server 240 of the presentity is configured as a SUBSCRIBE to presence event about the presentity, like a conventional presence subscription request. To indicate that this message is a presence subscription delegation request, the "History-info" is added and its value is set to indicate delegation and the ID of the delegating user extracted from the received presence subscription delegation request message. For example, the "History-info" can be written as History-info: <delegating user URI; target=presentity URI>;

index=1; delegation. <presentity URI> is written in "Request Line" and <URI of delegated user> is written in "From header" based on information extracted from the presence subscription delegation request message. "Contact header" is set to <contact URI of presence subscription delegation handler of delegating user>. To indicate the successful delegation authorization, the presence subscription delegation request message includes the ID of the delegating user authorized in his domain. In accordance with an exemplary embodiment of the present invention regarding the inclusion of the ID of the delegating user, the presence subscription delegation handler 220 adds a P-Asserted-Identity header defined in RFC 3325 "Private Extensions to the Session Initiation Protocol (SIP) for Asserted Identity within Trusted Networks" and includes <delegating user URI> as a value of the header.

Table 2 illustrates an exemplary presence subscription delegation request message that the presence subscription delegation handler 220 as a B2BUA transmits to the presence server 240 of the presentity.

TABLE 2

SUBSCRIBE <presentity URI>
Via: ...
To: <presentity URI>
From: <URI of delegated user>; tag=abc
Call-ID: 500
CSeq: 100 SUBSCRIBE
Event: presence
Expires: 600
Accept: application/pidf+xml
Require: histinfo
History-Info: <delegating user URI; target=presentity URI> ;index=1 ;delegation
Contact: <contact URI of presence subscription delegation handler>
P-Asserted-Identity: <delegating user URI>
Content-Type; ...
Content-Length: ...
[optional simple-filter of delegated user]

To satisfy the requirements for the presence subscription delegation request message that the presence subscription delegation handler 220 as a B2BUA transmits to the presence server 240, it can be further contemplated as another exemplary embodiment of the present invention that the presence subscription delegation request message is configured as a SUBSCRIBE to presence event of a presentity like a conventional presence subscription request but includes a new SIP header (e.g. a Delegation header) for presence subscription delegation and sets the ID of the delegating user as a value of the SIP header. Also, the ID of the delegating user authorized in the domain of the delegating user is included in the message in order to indicate that the delegation authorization is successful. In an exemplary embodiment of the present invention regarding the inclusion of the ID of the delegating user, the presence subscription delegation handler 220 adds a P-Asserted-Identity header defined in RFC 3325 "Private Extensions to the Session Initiation Protocol (SIP) for Asserted Identity within Trusted Networks" and includes <delegating user URI> as a value of the header.

Table 2a below illustrates another exemplary presence subscription delegation request message that the presence subscription delegation handler 220 as a B2BUA transmits to the presence server 240 of the presentity according to the present invention.

TABLE 2a

SUBSCRIBE <presentity URI>
Via: ...
To: <presentity URI>
From: <URI of delegated user>; tag=abc
Call-ID: 500
CSeq: 100 SUBSCRIBE
Event: presence
Expires: 600
Accept: application/pidf+xml
Delegation: <delegating user URI>
P-Asserted-Identity: < delegating user URI>
Contact: <contact URI of presence subscription delegation handler>
Content-Type: ...
Content-Length: ...
[optional simple-filter of delegated user]

To satisfy the requirements of the presence subscription delegation request message that the presence subscription delegation handler 220 as a B2BUA transmits to the presence server 240 of the presentity, it can be further contemplated as a further exemplary embodiment of the present invention that the presence subscription delegation request message is configured as a SUBSCRIBE to presence event of a presentity like a conventional presence subscription but includes a "Referred-by" header defined in RFC 3892 "The Session Initiation Protocol (SIP) Referred-By Mechanism" and describes the URI of the delegated user as a value of the header. To indicate the ID of the delegating user, it is set in "From header". Also, the ID of the delegating user authorized in the domain of the delegating user is included in the message in order to indicate that the delegation authorization is successful. In an exemplary embodiment of the present invention regarding the inclusion of the ID of the delegating user, the presence subscription delegation handler 220 adds a P-Asserted-Identity header defined in RFC 3325 "Private Extensions to the Session Initiation Protocol (SIP) for Asserted Identity within Trusted Networks" and includes <delegating user URI> as a value of the header.

Table 2b below illustrates a third exemplary presence subscription delegation request message that the presence subscription delegation handler 220 as a B2BUA transmits to the presence server 240 of the presentity according to the present invention.

TABLE 2b

SUBSCRIBE <presentity URI>
Via: ...
To: <presentity URI>
From: <delegating user URI>; tag=abc
Call-ID: 500
CSeq: 100 SUBSCRIBE
Event: presence
Expires: 600
Accept: application/pidf+xml
Referred-by: <URI of delegated user>
P-Asserted-Identity: <delegating user URI>
Contact: <contact URI of presence subscription delegation handler>
Content-Type: ...
Content-Length: ...
[optional simple-filter of delegated user]

To satisfy the requirements of the presence subscription delegation request message that the presence subscription delegation handler 220 as a B2BUA transmits to the presence server 240 of the presentity, it can be further contemplated as still another exemplary embodiment of the present invention that the presence subscription delegation request message is configured as a SUBSCRIBE to presence event of a presentity like a conventional presence subscription request but includes a "Referred-by" header defined in RFC 3892 "The Session Initiation Protocol (SIP) Referred-By Mechanism" to indicate that this message is for presence subscription delegation and deliver the ID of the delegating user and describes the URI of the delegating user as a value of the header. The ID of the delegated user is set in "From header". Also, the ID of the delegating user authorized in the domain of the delegating user is included in the message in order to indicate that the delegation authorization is successful. In an exemplary embodiment of the present invention regarding the inclusion of the ID of the delegation user, the presence subscription delegation handler 220 adds a P-Asserted-Identity header defined in RFC 3325 "Private Extensions to the Session Initiation Protocol (SIP) for Asserted Identity within Trusted Networks" and includes <delegating user URI> as a value of the header.

Table 2c below illustrates a fourth exemplary presence subscription delegation request message that the presence subscription delegation handler 220 as a B2BUA transmits to the presence server 240 of the presentity according to the present invention.

TABLE 2c

SUBSCRIBE <presentity URI>
Via: ...
To: <presentity URI>
From: <URI of delegated user>; tag=abc
Call-ID: 500
CSeq: 100 SUBSCRIBE
Event: presence
Expires: 600
Accept: application/pidf+xml
Referred-by: <delegating user URI>
P-Asserted-Identity: <delegating user URI>
Contact: <contact URI of presence subscription delegation handler>
Content-Type: ...
Content-Length: ...
[optional simple-filter of delegated user]

To satisfy the requirements of the presence subscription delegation request message that the presence subscription delegation handler 220 as a B2BUA transmits to the presence server 240 of the presentity, it can be further contemplated as yet another exemplary embodiment of the present invention that the presence subscription delegation request message is configured as a SUBSCRIBE to presence event of a presentity like a conventional presence subscription request, but sets <delegating user URI; target=presentity URI> in "To header" and <URI of presence subscription delegated user> in "From header", like the request message from the watcher 200, and sets the contact URI of the presence subscription delegation handler in "Contact header" in order to indicate that this message is for presence subscription delegation and indicate the ID of the delegating user. Also, the ID of the delegating user authorized in the domain of the delegating user is included in the message in order to indicate that the delegation authorization is successful. In an exemplary embodiment of the present invention regarding the inclusion of the ID of the delegation user, the presence subscription delegation handler 220 adds a P-Asserted-Identity header defined in RFC 3325 "Private Extensions to the Session Initiation Protocol (SIP) for Asserted Identity within Trusted Networks" and includes <delegating user URI> as a value of the header.

Table 2d below illustrates a fifth exemplary presence subscription delegation request message that the presence subscription delegation handler 220 as a B2BUA transmits to the presence server 240 of the presentity according to the present invention.

TABLE 2d

SUBSCRIBE <presentity URI>
Via: ...
To: <delegating user URI; target=presentity URI>
From: <URI of delegated user>; tag=abc
Call-ID: 500
CSeq: 100 SUBSCRIBE
Event: presence
Expires: 600
Accept: application/pidf+xml
Referred-by: <delegating user URI>
P-Asserted-Identity: <delegating user URI>
Contact: <contact URI of presence subscription delegation handler>
Content-Type: ...
Content-Length: ...
[optional simple-filter of delegated user]

In accordance with the present invention, the SIP/IP core 221 of the delegated user routes the presence subscription delegation request message that the presence subscription delegation handler 220 as a B2BUA intends to transmit to the presence server 240 of the presentity to the domain of the presentity. An SIP/IP core 241 of the presentity routes the received message to the presence server 240 of the presentity. For clarity, the SIP/IP core routing part is marked simply with a dotted line in FIG. 4. The SIP/IP core 221 of the presence subscription delegation handler 220 and the SIP/IP core 211 are the same entity, although they are separately shown for illustrative purposes.

The presence server 240 in the domain of the presentity performs the afore-described delegated presence authorization, considering that the received message is not a conventional presence subscription request but a presence subscription delegation request in step 4.

If the delegated presence authorization is successful, the presence server 240 transmits an SIP 200 OK message to the presence subscription delegation handler 220. The presence subscription delegation handler 220 as a B2BUA transmits the SIP 200 OK message to the watcher (or delegated user) 200. Therefore, an SIP session for presence subscription delegation is successfully created between the presence subscription delegation handler 220 and the presence server 240 and between the delegated user 200 and the presence subscription delegation handler 220 in steps 5 to 8.

After the successful SIP session creation, the presence server 240 generates a initial Presence Event NOTIFY message for the presence subscription delegation request in the conventional manner in step 9. The initial Presence Event NOTIFY message includes presence information about the presentity requested by the presence subscription delegation request in the conventional SIP event notification technology. As described before, the presence information about the presentity includes information permitted to the delegating user by the delegated presence authorization of step 4 according to the present invention. The initial Presence Event NOTIFY message is generated in the SIP session created in step 6 for presence subscription delegation between the presence subscription delegation handler 220 and the presence server 240 and transmitted to the presence subscription delegation handler 220. To do so, the initial Presence Event NOTIFY message has "Request Line" set to <contact URI of presence subscription delegation handler> and "From", "To" and "Call-ID" headers set to indicate the SIP session for presence subscription delegation between the presence subscription delegation handler 220 and the presence server 240. That is, <presentity URI> is described along with a tag of an already generated SIP session in "From header", <URI of delegated user> is described along with a tag of the already generated SIP session in "From header", and the ID of the already generated SIP session is written in "Call-ID header" in an exemplary embodiment of the present invention described in Tables 2a, 2b and 2c. <presentity URI> is described along with a tag of an already generated SIP session in "From header", <delegating user URI> is described along with a tag of the already generated SIP session in "To header", and the ID of the already generated SIP session is written in "Call-ID header" in an exemplary embodiment of the present invention described in Table 2b. "Contact header" is set to <contact URI of the presence server 240> and the other headers are set in the conventional manner.

Table 3 illustrates an exemplary initial Presence Event NOTIFY message that the presence server 240 of the presentity transmits to the presence subscription delegation handler 220.

TABLE 3

NOTIFY <contact URI of presence subscription delegation handler>
Via: ...
From: <presentity URI>; tag=xyz
To: <URI of delegated user>; tag=abc
Call-ID: 500
CSeq: 111 NOTIFY
Event: presence
Subscription-State: active; expires=599
Contact: <contact URI of presence server>
Content-Type; application/pidf+xml
Content-Length: ...
[presence document of presentity]

The SIP/IP core 241 of the presence server 240 routes the initial Presence Event NOTIFY message to the domain of the delegating user. The SIP/IP core 211 in the domain of the delegating user routes the received message to the presence subscription delegation handler 220. For clarity, the SIP/IP core routing part is marked simply with a dotted line in FIG. 4.

Upon successful receipt of the initial Presence Event NOTIFY message, the presence subscription delegation handler 240 replies with an SIP 200 OK message in step 10. Then the presence subscription delegation handler 220 acts as a B2BUA. Hence, it extracts presence information about the presentity from the received Presence Event NOTIFY message, applies a changed or added presence delegation authorization rule to the message in step 11 and generates an initial Presence Event NOTIFY message indicating the rule application result in the SIP session for presence subscription delegation between the delegated user 200 and the presence subscription delegation handler 220 and transmits it to the delegated user 200 in step 12. In the initial Presence Event NOTIFY message transmitted by the presence subscription delegation handler 220, <contact URI of delegated user> is set in "Request Line" and "From", "To" and "Call-ID" headers are set to indicate the SIP session for presence subscription delegation created between the delegated user 200 and the presence subscription delegation handler 220 in step 8. "Contact header" is set to <contact URI of the presence subscription delegation handler 220> and the other headers are set in the conventional manner.

Table 4 illustrates an exemplary initial Presence Event NOTIFY message that the presence subscription delegation handler 220 of the delegating user transmits to the delegated user 200.

TABLE 4

NOTIFY <contact URI of delegated user>
Via: ...
From: <delegating user URI; target=presentity URI>; tag=789
To: <URI of delegated user>; tag=123
Call-ID: 100
CSeq: 10 NOTIFY
Event: presence
Subscription-State: active; expires=599
Contact: <contact URI of presence subscription delegation handler>
Content-Type; application/pidf+xml
Content-Length: ...
[presence document of presentity]

Figure 5:
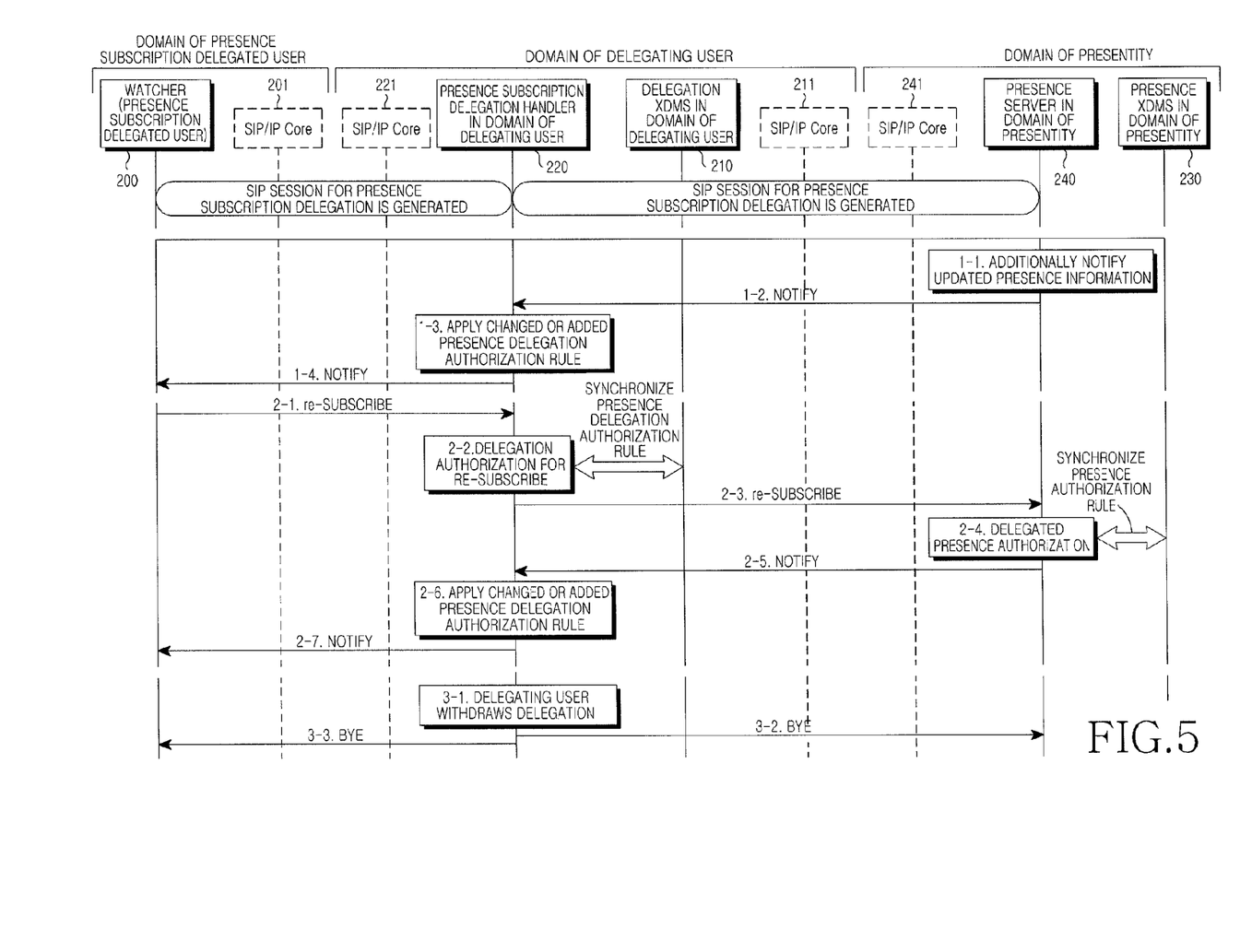
FIG. 5 is a diagram illustrating a signal flow for continuously controlling additional presence subscription delegation requests of a presence subscription delegated user and notifications for the requests by a presence subscription delegation handler as a Back-to-Back User Agent (B2BUA) according to an exemplary embodiment of the present invention.

FIG. 5 is a diagram illustrating a signal flow for continuously controlling an additional presence subscription delegation request of the delegated user 200 and a presence event notification transmitted to the delegated user 200 by the presence subscription delegation handler 220 as a B2BUA according to an exemplary embodiment of the present invention.

In FIG. 5, an additional signaling flow for the following situations is illustrated, with SIP sessions for presence subscription delegation created among the delegated user 200, the presence subscription delegation handler 240 of the delegating user, and the presence server 240 of the presentity according to the afore-described procedure of the presence subscription delegation system.

After the SIP sessions are generated for presence subscription delegation, the presence server 240 of the presentity can deliver additional updated presence information about the presentity to the delegated user 200 via the presence subscription delegation handler 220 in the same manner as the initial presence event notification procedure of steps 9 to 13 in FIG. 4. When the presence subscription delegation handler 220 transmits a Presence Event NOTIFY message to the delegated user 200, the presence subscription delegation handler 220 can apply an additional presence delegation authorization rule to presence information to be delivered and transmit the rule application result, as in the presence subscription delegation notification procedure, in steps 1-1 to 1-4. Thus, the delegating user can control presence subscription delegation continuously through the presence subscription delegation handler 220.

After the SIP sessions are created for presence subscription delegation, the delegated user 200 can re-request presence subscription delegation by re-SUBSCRIBE. The initial presence subscription delegation procedure (all steps of FIG. 4) can also apply to this case. Hence, the presence subscription delegation handler 220 performs delegation authorization and the presence server 240 performs delegated presence authorization in steps 2-1 to 2-7. In this manner, the delegating user can control presence subscription delegation continuously through the presence subscription delegation handler 220.

After the SIP sessions are created for presence subscription delegation, the delegating user can withdraw the presence subscription delegation from the delegated user 200 by changing the presence delegation authorization rule. In this case, the presence subscription delegation handler 220 can terminate the SIP sessions for presence subscription delegation by transmitting an SIP BYE message to the delegated user 200 and the presence server 240 of the presentity in steps 3-1, 3-2 and 3-3. Hence, the delegating user can control presence subscription delegation continuously through the presence subscription delegation handler 220.

The presence subscription delegation handler 220 of the delegating user is a logical entity, which can be configured in various methods in the domain of the delegating user in the presence subscription delegation system of the present invention. One of the methods is that the presence subscription delegation handler 220 can be implemented as a watcher agent in the domain of the delegating user in the present invention. In addition, the presence subscription delegation handler 220 can also be implemented as another presence entity in the domain of the delegating user, for example, a Resource List Server (RLS), a presence server, or the like in the present invention.

EFFECT OF THE INVENTION

As is apparent from the above description, the presence subscription delegation system enables a watcher to request presence subscription as a delegated user on behalf of a delegating user, enables the delegating user to control presence subscription delegation associated with himself, enables the delegating user to continues the control, and enables a presentity to determine whether a presence subscription request received from the watcher is for conventional presence subscription or for presence subscription delegation, to thereby control presence subscription delegation requests separately.

The presence subscription delegation can be performed even when the watcher (i.e. the delegated user), the delegating user, and the presentity reside in different domains as well as in the same domain.

What is claimed is:

1. A device for presence subscription delegation, the device comprising:
    a presence subscription delegation handler for receiving a presence subscription delegation request from a watcher and for performing delegation authorization for the presence subscription delegation request according to a presence delegation authorization rule of a delegating user being authorization information about presence subscription delegation, wherein the delegation authorization determines whether the delegating user has delegated authority of the presence subscription delegation request for a presence information about a presentity authorized to the delegating user to the watcher for requesting presence subscription on behalf of the delegating user,
    wherein the presence subscription delegation handler transmits the presence subscription delegation request to a presence server of a presentity,
    wherein the presence subscription delegation handler receives presence information about the presentity from the presence server after the presence server performs presence authorization according to a presence authorization rule of the presentity,
    wherein the presence subscription delegation handler transmits the presence information about the presentity to the watcher,
    wherein the presence subscription delegation request is transmitted from the watcher as a delegated user and the delegated user requests the presence information about the presentity on behalf of a delegating user, and
    wherein the delegating user sets the presence subscription delegation to the watcher.

2. The device of claim 1, wherein the watcher, the presence subscription delegation handler, and the presence server are in different domains and are connected by a Session Initiation Protocol (SIP) session.

3. The device of claim 1, the presence delegation authorization rule preset by the delegating user is stored in a delegation XML Document Management Server (delegation XDMS).

4. The device of claim 1, wherein the presence delegation authorization rule includes information about a watcher permitted to request presence subscription delegation, and information about types of presence information permitted for presence subscription delegation.

5. The device of claim 1, wherein the presence authorization rule is stored in a presence XDMS.

6. The device of claim 1, wherein the presence authorization rule includes information indicating whether the presentity permits presence subscription delegation for presence information, information about a watcher permitted to request presence subscription delegation, and information about types of permitted presence information.

7. A method for presence subscription delegation, the method comprising the following computer-implemented steps:
    receiving, by a presence subscription delegation handler, a presence subscription delegation request from a watcher;
    performing, by the presence subscription delegation handler, delegation authorization for the presence subscription delegation request according to a presence delegation authorization rule of a delegating user being authorization information about presence subscription delegation, wherein the delegation authorization determines whether the delegating user has delegated authority of the presence subscription delegation request for a presence information about a presentity authorized to the delegating user to the watcher for requesting presence subscription on behalf of the delegating user;
    transmitting, by the presence subscription delegation handler, the presence subscription delegation request to a presence server of a presentity, if the delegation authorization is successful;
    receiving presence information about the presentity from the presence server after the presence server performs presence authorization according to a presence authorization rule of the presentity; and
    transmitting, by the presence subscription delegation handler, the presence information about the presentity to the watcher,
    wherein the presence subscription delegation request is transmitted from the watcher as a delegated user and the delegated user requests the presence information about the presentity on behalf of a delegating user, and
    wherein the delegating user sets the presence subscription delegation to the watcher.

8. The method of claim 7, wherein the watcher, the presence subscription delegation handler, and the presence server are in different domains and are connected by a Session Initiation Protocol (SIP) session.

9. The method of claim 7, wherein the presence delegation authorization rule is preset by the delegating user and stored in a delegation XML Document Management Server (delegation XDMS).

10. The method of claim 7, wherein the presence delegation authorization rule includes information about a watcher permitted to request presence subscription delegation, and information about types of presence information permitted for presence subscription delegation.

11. The method of claim 7, wherein the presence authorization rule is stored in a presence XDMS.

12. The method of claim 7, wherein the presence authorization rule includes information indicating whether the presentity permits presence subscription delegation for presence information, information about a watcher permitted to request presence subscription delegation, and information about types of permitted presence information.

13. The method of claim 7, wherein the performing of the delegation authorization for the presence subscription delegation request comprises:
  receiving the presence delegation authorization rule from a delegation XML Document Management Server (delegation XDMS).

14. The method of claim 7, further comprising:
  synchronizing, by the presence subscription delegation handler, the presence delegation authorization rule with a corresponding presence delegation authorization rule stored on a delegation XML Document Management Server (delegation XDMS).

15. The device of claim 1, wherein the presence subscription delegation handler is further configured for receiving the delegation authorization rule from a delegation XML Document Management Server (delegation XDMS).

16. The device of claim 1, wherein the presence subscription delegation handler is further configured for synchronizing the delegation authorization rule with a corresponding delegation authorization rules stored on a delegation XML Document Management Server (delegation XDMS).

* * * * *